US012634276B2

(12) United States Patent
Halemane et al.

(10) Patent No.: US 12,634,276 B2
(45) Date of Patent: May 19, 2026

(54) AUTHENTICATION SYSTEM

(71) Applicant: Ping Identity Corporation, Denver, CO (US)

(72) Inventors: Sukhesh Halemane, Santa Clara, CA (US); Mahantesh Pattanshetti, Pleasanton, CA (US); Suman Sharma, Saratoga, CA (US)

(73) Assignee: Ping Identity Corporation, Denver, CO (US)

( * ) Notice: Subject to any disclaimer, the term of this patent is extended or adjusted under 35 U.S.C. 154(b) by 178 days.

(21) Appl. No.: 18/095,984

(22) Filed: Jan. 11, 2023

(65) Prior Publication Data

US 2023/0224294 A1 Jul. 13, 2023

Related U.S. Application Data

(60) Provisional application No. 63/299,389, filed on Jan. 13, 2022.

(51) Int. Cl.
H04L 9/40 (2022.01)
(52) U.S. Cl.
CPC ........ H04L 63/083 (2013.01); H04L 63/0861 (2013.01)
(58) Field of Classification Search
None
See application file for complete search history.

(56) References Cited

U.S. PATENT DOCUMENTS

| | | |
|---|---|---|
| 5,153,918 A | 10/1992 | Tuai |
| 5,311,596 A | 5/1994 | Scott et al. |
| 5,420,606 A | 5/1995 | Begum et al. |
| 5,559,961 A | 9/1996 | Blonder |
| 5,875,394 A | 2/1999 | Daly et al. |
| 5,892,900 A | 4/1999 | Ginter et al. |
| 5,903,721 A | 5/1999 | Sixtus |
| 5,915,001 A | 6/1999 | Uppaluru |

(Continued)

FOREIGN PATENT DOCUMENTS

| | | |
|---|---|---|
| CN | 1533088 A | 9/2004 |
| CN | 101583968 A | 11/2009 |

(Continued)

OTHER PUBLICATIONS

Balaban, D., "Pioneering NFC Provider Service Provider Adds Bar Codes to New NFC Trial," [Online], published on Apr. 27, 2010, available on May 8, 2010, Retrieved from the Internet at http://www.nfctimes.com/news/pioneering-nfc-service-provider-adds-bar-codes-new-nfc-trial, 6 pages.

(Continued)

*Primary Examiner* — Syed A Roni

(57) ABSTRACT

We propose a method of authenticating a client device with a provider. The method includes receiving an authentication request from the client device at an authentication server. The method includes sending a challenge to a hardware-based security module of the client device based on the authentication request. The method includes receiving a response to the challenge and identifying the provider corresponding to the authentication request. The method includes authenticating the client device with the provider based on the authentication request and the response to the challenge.

18 Claims, 8 Drawing Sheets

(56)               References Cited

U.S. PATENT DOCUMENTS

| | | | |
|---|---|---|---|
| 5,991,407 A | 11/1999 | Murto | |
| 6,082,620 A | 7/2000 | Bone, Jr. | |
| 6,338,140 B1 | 1/2002 | Owens et al. | |
| 6,510,502 B1 | 1/2003 | Shimizu | |
| 6,584,309 B1 | 6/2003 | Whigham | |
| 6,687,346 B1 | 2/2004 | Swartz et al. | |
| 6,705,517 B1 | 3/2004 | Zajkowski et al. | |
| 6,760,711 B1 | 7/2004 | Gillett et al. | |
| 7,028,906 B2 | 4/2006 | Challa et al. | |
| 7,076,468 B2 | 7/2006 | Hillegass et al. | |
| 7,137,006 B1 | 11/2006 | Grandcolas et al. | |
| 7,257,834 B1 | 8/2007 | Boydstun et al. | |
| 7,263,717 B1 | 8/2007 | Boydstun et al. | |
| 7,347,361 B2 | 3/2008 | Lovett | |
| 7,356,510 B2 | 4/2008 | Durand et al. | |
| 7,373,515 B2 | 5/2008 | Owen et al. | |
| 7,392,226 B1 | 6/2008 | Sasaki et al. | |
| 7,409,543 B1 | 8/2008 | Bjorn | |
| 7,509,119 B2 | 3/2009 | Eonnet | |
| 7,529,710 B1 | 5/2009 | Clower et al. | |
| 7,657,489 B2 | 2/2010 | Stambaugh | |
| 7,698,276 B2 | 4/2010 | Seshadri et al. | |
| 7,706,784 B2 | 4/2010 | Weiner et al. | |
| 7,774,231 B2 | 8/2010 | Pond et al. | |
| 7,778,840 B2 | 8/2010 | Krause et al. | |
| 7,801,829 B2 | 9/2010 | Gray et al. | |
| 7,870,599 B2 | 1/2011 | Pemmaraju | |
| 7,962,762 B2 | 6/2011 | Kirsch et al. | |
| 8,032,927 B2 | 10/2011 | Ross | |
| 8,108,318 B2 | 1/2012 | Mardikar | |
| 8,185,956 B1 | 5/2012 | Bogorad et al. | |
| 8,244,211 B2 | 8/2012 | Clark | |
| 8,306,879 B2 | 11/2012 | Nonaka | |
| 8,346,672 B1 | 1/2013 | Weiner et al. | |
| 8,359,278 B2 | 1/2013 | Domenikos et al. | |
| 8,443,191 B2 | 5/2013 | Beckwith et al. | |
| 8,453,940 B2 | 6/2013 | Diamond | |
| 8,479,022 B2 | 7/2013 | Dahan et al. | |
| 8,494,961 B1 | 7/2013 | Lucas et al. | |
| 8,510,820 B2 | 8/2013 | Oberheide et al. | |
| 8,578,454 B2 | 11/2013 | Grim | |
| 8,615,794 B1 | 12/2013 | Tomilson et al. | |
| 8,626,139 B2 | 1/2014 | Kirkup et al. | |
| 8,736,424 B2 | 5/2014 | Shoarinejad et al. | |
| 8,739,259 B1 | 5/2014 | Kumar et al. | |
| 8,763,077 B2 | 6/2014 | Oberheide et al. | |
| 8,763,097 B2 | 6/2014 | Bhatnagar et al. | |
| 8,799,410 B2 | 8/2014 | Fiatal | |
| 8,805,434 B2 | 8/2014 | Vasudevan | |
| 8,887,257 B2 | 11/2014 | Haggerty et al. | |
| 9,098,850 B2 | 8/2015 | Weiner et al. | |
| 9,196,111 B1 | 11/2015 | Newman et al. | |
| 9,353,339 B2 | 5/2016 | Choi et al. | |
| 9,628,508 B2 | 4/2017 | Turbin | |
| 9,781,105 B2 | 10/2017 | Weiner et al. | |
| 9,830,594 B2 | 11/2017 | Weiner | |
| 9,886,688 B2 | 2/2018 | Weiner et al. | |
| 10,108,963 B2 | 10/2018 | Weiner et al. | |
| 11,102,655 B1 * | 8/2021 | Young | H04W 12/50 |
| 2001/0014870 A1 | 8/2001 | Saito et al. | |
| 2002/0023027 A1 | 2/2002 | Simonds | |
| 2002/0028671 A1 | 3/2002 | l'Anson et al. | |
| 2002/0042722 A1 | 4/2002 | Tsuji et al. | |
| 2002/0046299 A1 | 4/2002 | Lefeber et al. | |
| 2002/0059142 A1 | 5/2002 | Krause et al. | |
| 2002/0091569 A1 | 7/2002 | Kitaura et al. | |
| 2002/0198777 A1 | 12/2002 | Yuasa | |
| 2003/0047613 A1 | 3/2003 | Funamoto et al. | |
| 2003/0115150 A1 | 6/2003 | Hamilton et al. | |
| 2003/0149663 A1 | 8/2003 | Vonholm et al. | |
| 2003/0163384 A1 | 8/2003 | Hendra | |
| 2003/0163567 A1 | 8/2003 | McMorris et al. | |
| 2003/0193441 A1 | 10/2003 | Zimmerman et al. | |
| 2003/0225618 A1 | 12/2003 | Hessburg et al. | |
| 2004/0059909 A1 | 3/2004 | Le Pennec et al. | |
| 2004/0068481 A1 | 4/2004 | Seshadri et al. | |
| 2004/0117254 A1 | 6/2004 | Nemirofsky et al. | |
| 2004/0117262 A1 | 6/2004 | Berger et al. | |
| 2004/0121781 A1 | 6/2004 | Sammarco | |
| 2004/0168083 A1 | 8/2004 | Gasparini et al. | |
| 2004/0186768 A1 | 9/2004 | Wakim et al. | |
| 2004/0187018 A1 | 9/2004 | Owen et al. | |
| 2004/0243519 A1 | 12/2004 | Perttila et al. | |
| 2005/0027700 A1 | 2/2005 | Turner et al. | |
| 2005/0071673 A1 | 3/2005 | Saito | |
| 2005/0091539 A1 | 4/2005 | Wang et al. | |
| 2005/0120213 A1 | 6/2005 | Winget et al. | |
| 2005/0165684 A1 | 7/2005 | Jensen et al. | |
| 2005/0166060 A1 | 7/2005 | Goldthwait et al. | |
| 2005/0175019 A1 | 8/2005 | Kalavade et al. | |
| 2005/0181734 A1 | 8/2005 | Coutts et al. | |
| 2005/0239445 A1 | 10/2005 | Karaoguz et al. | |
| 2005/0242921 A1 | 11/2005 | Zimmerman et al. | |
| 2005/0246243 A1 | 11/2005 | Adams et al. | |
| 2005/0254514 A1 | 11/2005 | Lynn | |
| 2005/0255889 A1 | 11/2005 | Haseba et al. | |
| 2005/0258237 A1 | 11/2005 | Urakami et al. | |
| 2005/0289652 A1 | 12/2005 | Sharma et al. | |
| 2006/0041755 A1 | 2/2006 | Pemmaraju | |
| 2006/0044115 A1 | 3/2006 | Doi et al. | |
| 2006/0089912 A1 | 4/2006 | Spagna et al. | |
| 2006/0090067 A1 | 4/2006 | Edmonds et al. | |
| 2006/0153172 A1 | 7/2006 | Yamada et al. | |
| 2006/0165060 A1 | 7/2006 | Dua | |
| 2006/0174322 A1 | 8/2006 | Turner et al. | |
| 2006/0174332 A1 | 8/2006 | Bauban et al. | |
| 2006/0206709 A1 | 9/2006 | Labrou et al. | |
| 2006/0230145 A1 | 10/2006 | Zarakhovsky et al. | |
| 2006/0235796 A1 | 10/2006 | Johnson et al. | |
| 2006/0237528 A1 | 10/2006 | Bishop et al. | |
| 2006/0259967 A1 | 11/2006 | Thomas et al. | |
| 2006/0271643 A1 | 11/2006 | Stallman | |
| 2007/0055749 A1 | 3/2007 | Chien | |
| 2007/0078962 A1 | 4/2007 | Donnelli et al. | |
| 2007/0088950 A1 | 4/2007 | Wheeler et al. | |
| 2007/0107044 A1 | 5/2007 | Yuen et al. | |
| 2007/0156436 A1 | 7/2007 | Fisher et al. | |
| 2007/0192245 A1 | 8/2007 | Fisher et al. | |
| 2007/0194123 A1 | 8/2007 | Frantz et al. | |
| 2007/0202894 A1 | 8/2007 | Dhebri et al. | |
| 2007/0214155 A1 | 9/2007 | Chang et al. | |
| 2007/0255653 A1 | 11/2007 | Tumminaro et al. | |
| 2008/0028228 A1 | 1/2008 | Mardikar et al. | |
| 2008/0084272 A1 | 4/2008 | Modiano | |
| 2008/0091618 A1 | 4/2008 | Obrea et al. | |
| 2008/0097925 A1 | 4/2008 | King | |
| 2008/0104691 A1 | 5/2008 | Takeda et al. | |
| 2008/0147546 A1 | 6/2008 | Weichselbaumer et al. | |
| 2008/0168050 A1 | 7/2008 | Reyes et al. | |
| 2008/0208759 A1 | 8/2008 | Royyuru | |
| 2008/0210754 A1 | 9/2008 | Lovett | |
| 2008/0222031 A1 | 9/2008 | Shattner et al. | |
| 2008/0227471 A1 | 9/2008 | Dankar et al. | |
| 2008/0270301 A1 | 10/2008 | Jones et al. | |
| 2008/0307515 A1 | 12/2008 | Drokov et al. | |
| 2009/0044025 A1 | 2/2009 | She | |
| 2009/0062939 A1 | 3/2009 | Park | |
| 2009/0076966 A1 | 3/2009 | Bishop et al. | |
| 2009/0119190 A1 | 5/2009 | Realini | |
| 2009/0119756 A1 | 5/2009 | Acuna et al. | |
| 2009/0119757 A1 | 5/2009 | Acuna et al. | |
| 2009/0138366 A1 | 5/2009 | Bemmel et al. | |
| 2009/0158034 A1 | 6/2009 | Gu et al. | |
| 2009/0165121 A1 | 6/2009 | Kumar | |
| 2009/0200371 A1 | 8/2009 | Kean et al. | |
| 2009/0217359 A1 | 8/2009 | Kikkawa et al. | |
| 2009/0233579 A1 | 9/2009 | Castell et al. | |
| 2009/0235178 A1 | 9/2009 | Cipriani et al. | |
| 2009/0249439 A1 | 10/2009 | Olden et al. | |
| 2009/0287565 A1 | 11/2009 | Bishop et al. | |
| 2009/0288012 A1 | 11/2009 | Hertel et al. | |
| 2009/0291685 A1 | 11/2009 | Morimoto | |
| 2009/0292619 A1 | 11/2009 | Kagan et al. | |
| 2009/0305725 A1 | 12/2009 | Shin et al. | |

(56) References Cited

U.S. PATENT DOCUMENTS

| | | | |
|---|---|---|---|
| 2009/0307142 | A1 | 12/2009 | Mardikar |
| 2009/0320134 | A1 | 12/2009 | Corcoran et al. |
| 2010/0031349 | A1 | 2/2010 | Bingham |
| 2010/0049615 | A1 | 2/2010 | Rose et al. |
| 2010/0057843 | A1 | 3/2010 | Landsman et al. |
| 2010/0114776 | A1 | 5/2010 | Weller et al. |
| 2010/0144314 | A1 | 6/2010 | Sherkin et al. |
| 2010/0146263 | A1 | 6/2010 | Das et al. |
| 2010/0161410 | A1 | 6/2010 | Tulloch |
| 2010/0179907 | A1 | 7/2010 | Atkinson |
| 2010/0199086 | A1 | 8/2010 | Kuang et al. |
| 2010/0262830 | A1 | 10/2010 | Kusakawa et al. |
| 2010/0268618 | A1 | 10/2010 | McQuilken |
| 2010/0306113 | A1 | 12/2010 | Gray et al. |
| 2010/0312703 | A1 | 12/2010 | Kulpati et al. |
| 2010/0318801 | A1 | 12/2010 | Roberge et al. |
| 2011/0022484 | A1 | 1/2011 | Smith et al. |
| 2011/0070901 | A1 | 3/2011 | Alward |
| 2011/0071978 | A1 | 3/2011 | Lottridge et al. |
| 2011/0078081 | A1 | 3/2011 | Pirzadeh et al. |
| 2011/0109426 | A1 | 5/2011 | Harel et al. |
| 2011/0119155 | A1 | 5/2011 | Hammad et al. |
| 2011/0131419 | A1 | 6/2011 | Dowds et al. |
| 2011/0137804 | A1 | 6/2011 | Peterson |
| 2011/0196946 | A1 | 8/2011 | Manchester et al. |
| 2011/0219230 | A1 | 9/2011 | Oberheide et al. |
| 2011/0251892 | A1 | 10/2011 | Laracey |
| 2011/0251955 | A1 | 10/2011 | Lam |
| 2011/0265149 | A1 | 10/2011 | Ganesan |
| 2012/0005026 | A1 | 1/2012 | Khan et al. |
| 2012/0011058 | A1 | 1/2012 | Pitroda et al. |
| 2012/0031969 | A1 | 2/2012 | Hammad |
| 2012/0130714 | A1 | 5/2012 | Zeljkovic et al. |
| 2012/0144461 | A1 | 6/2012 | Rathbun |
| 2012/0185932 | A1 | 7/2012 | Stougaard et al. |
| 2012/0198228 | A1 | 8/2012 | Oberheide et al. |
| 2012/0201190 | A1 | 8/2012 | Sawai |
| 2012/0240204 | A1 | 9/2012 | Bhatnagar et al. |
| 2012/0246702 | A1 | 9/2012 | Shepler et al. |
| 2012/0303528 | A1 | 11/2012 | Weiner et al. |
| 2012/0309291 | A1 | 12/2012 | Sawai |
| 2012/0331536 | A1 | 12/2012 | Chabbewal et al. |
| 2013/0023240 | A1 | 1/2013 | Weiner |
| 2013/0031006 | A1 | 1/2013 | McCullagh et al. |
| 2013/0046976 | A1 | 2/2013 | Rosati et al. |
| 2013/0054320 | A1 | 2/2013 | Dorso et al. |
| 2013/0080327 | A1 | 3/2013 | Baldrick et al. |
| 2013/0117822 | A1 | 5/2013 | Soulez |
| 2013/0204690 | A1 | 8/2013 | Liebmann |
| 2013/0212387 | A1 | 8/2013 | Oberheide et al. |
| 2013/0252583 | A1 | 9/2013 | Brown et al. |
| 2013/0267200 | A1 | 10/2013 | Weiner et al. |
| 2013/0347094 | A1 | 12/2013 | Bettini et al. |
| 2014/0013387 | A1 | 1/2014 | Vangpat et al. |
| 2014/0013390 | A1 | 1/2014 | Sade et al. |
| 2014/0040149 | A1 | 2/2014 | Fiske |
| 2014/0067509 | A1 | 3/2014 | Weiner |
| 2014/0074637 | A1 | 3/2014 | Hammad |
| 2014/0108785 | A1* | 4/2014 | Lindteigen ........... H04L 9/0861 |
| | | | 713/156 |
| 2014/0114846 | A1 | 4/2014 | Weiner |
| 2014/0164253 | A1 | 6/2014 | Dominguez |
| 2014/0189808 | A1* | 7/2014 | Mahaffey ........... G06F 21/6245 |
| | | | 726/4 |
| 2014/0214688 | A1 | 7/2014 | Weiner et al. |
| 2014/0236834 | A1 | 8/2014 | Appalsamy |
| 2014/0282961 | A1 | 9/2014 | Dorfman et al. |
| 2014/0358780 | A1 | 12/2014 | Fujioka |
| 2014/0376385 | A1 | 12/2014 | Boss et al. |
| 2015/0023160 | A1 | 1/2015 | Alisawi |
| 2015/0073992 | A1 | 3/2015 | Weiner et al. |
| 2015/0142589 | A1 | 5/2015 | Jin et al. |
| 2015/0304850 | A1 | 10/2015 | Weiner et al. |
| 2016/0050071 | A1* | 2/2016 | Collart .................. H04L 9/3234 |
| | | | 713/193 |
| 2016/0050565 | A1* | 2/2016 | Benoit .................... H04L 63/18 |
| | | | 726/9 |
| 2016/0330199 | A1 | 11/2016 | Weiner et al. |
| 2017/0099137 | A1 | 4/2017 | Pang et al. |
| 2018/0035481 | A1 | 2/2018 | Panther |
| 2020/0007325 | A1* | 1/2020 | Jain .................... H04L 63/0853 |

FOREIGN PATENT DOCUMENTS

| | | |
|---|---|---|
| CN | 101916487 A | 12/2010 |
| CN | 102057385 A | 5/2011 |
| EP | 1424861 A1 | 6/2004 |
| EP | 1460573 A2 | 9/2004 |
| EP | 2611097 A1 | 7/2013 |
| FR | 2832829 A1 | 5/2003 |
| GB | 2460304 A | 12/2009 |
| JP | H10145354 A | 5/1998 |
| JP | 2001084311 A | 3/2001 |
| JP | 2005173982 A | 6/2005 |
| JP | 2005215849 A | 8/2005 |
| JP | 2005276025 A | 10/2005 |
| JP | 2005533316 A | 11/2005 |
| JP | 2006014159 A | 1/2006 |
| JP | 2006171855 A | 6/2006 |
| JP | 2006197458 A | 7/2006 |
| JP | 2006221351 A | 8/2006 |
| JP | 2006338638 A | 12/2006 |
| JP | 2006350450 A | 12/2006 |
| JP | 2007188150 A | 7/2007 |
| JP | 2007280363 A | 10/2007 |
| JP | 2008210368 A | 9/2008 |
| JP | 2008287321 A | 11/2008 |
| JP | 2009058637 A | 3/2009 |
| JP | 2009193155 A | 8/2009 |
| JP | 2010009161 A | 1/2010 |
| JP | 2010231777 A | 10/2010 |
| JP | 2010250374 A | 11/2010 |
| JP | 2011002994 A | 1/2011 |
| JP | 2011053767 A | 3/2011 |
| WO | WO-9834421 A2 | 8/1998 |
| WO | WO-0173580 A1 | 10/2001 |
| WO | WO-0208981 A1 | 1/2002 |
| WO | WO-0219199 A1 | 3/2002 |
| WO | WO-0242926 A1 | 5/2002 |
| WO | WO-02060209 A1 | 8/2002 |
| WO | WO-02102099 A2 | 12/2002 |
| WO | WO-03027937 A2 | 4/2003 |
| WO | WO-03046847 A1 | 6/2003 |
| WO | WO-2006090392 A2 | 8/2006 |
| WO | WO-2006102848 A1 | 10/2006 |
| WO | WO-2007021658 A2 | 2/2007 |
| WO | WO-2007048976 A2 | 5/2007 |
| WO | WO-2007106906 A2 | 9/2007 |
| WO | WO-2007117073 A1 | 10/2007 |
| WO | WO-2008027620 A1 | 3/2008 |
| WO | WO-2009032687 A2 | 3/2009 |
| WO | WO-2009113057 A1 | 9/2009 |
| WO | WO-2009156880 A1 | 12/2009 |
| WO | WO-2009158570 A2 | 12/2009 |
| WO | WO-2010087535 A1 | 8/2010 |
| WO | WO-2010111023 A1 | 9/2010 |
| WO | WO-2010120222 A1 | 10/2010 |
| WO | WO-2010140876 A1 | 12/2010 |
| WO | WO-2011014837 A1 | 2/2011 |
| WO | WO-2011074500 A1 | 6/2011 |
| WO | WO-2011083471 A1 | 7/2011 |
| WO | WO-2012156977 A1 | 11/2012 |
| WO | WO-2012168940 A1 | 12/2012 |
| WO | WO-2013030832 A1 | 3/2013 |
| WO | WO-2013153552 A1 | 10/2013 |

OTHER PUBLICATIONS

Carr, M., "Mobile Payment Systems and Services: An Introduction," [Online], 2007, Retrieved from Internet on Jun. 25, 2012 at http://www.mpf.org.in/pdf/Mobile%20Payment%20Systems%20and%20Services.pdf, 12 pages.

(56) References Cited

OTHER PUBLICATIONS

Ericsson Inc., "One-time password using short message service, paging, and other telephony techniques," Research Disclosure, Kenneth Mason Publications, Hamshire, GB, vol. 423, No. 58, Jul. 1, 1999, 1 page.

Fun, T. S. et al., "Privacy in New Mobile Payment Protocol," World Academy of Science, Engineering and Technology, 2008, vol. 47, 6 pages.

Gao, J. et al., "P2P-Paid: A Peer-to-Peer Wireless Payment System," Proceedings of the 2005 Second IEEE International Workshop on Mobile Commerce and Services (WMCS'05), Institute of Electrical and Electronics Engineers (2005), 10 pages.

Heine, "GSM Networks: Protocols, Terminology, and Implementation," 1999, Artech House, Inc., Norwood, MA, pp. 116 and 328, 2 pages.

Insight-Driven Retailing Blog, "Is NFC too Slow?", Category: Oracle, Retrieved from the Internet on May 15, 2011, 5 pages.

IPCS Group, "IPCS & barcode enabling mobile payment," Retrieved from the Internet on Jun. 25, 2012, URL: http://www.ipcslive.com/pdf/IPCSbar.pdf, 2 pages.

Latze, C. et al., "A Proof of Concept Implementation of a Secure E-Commerce Authentication Scheme," Jul. 2009, Information Security South Africa, Johannesberg, South Africa, Retrieved from Internet on Jun. 25, 2012 at http://www.latze.ch/latze-ruppen-ultesnitsche.pdf, 13 pages.

MChek. The Mobile Money Solution, Brochure, 2008, [Online], Retrieved from Internet on Jun. 25, 2012 at http://main.mchek.com/pdf/mchek-brochure.pdf, 8 pages.

Miller, C. C., "Payment Method Bypasses the Wallet," The New York Times Reprint, May 23, 2011, 2 pages.

Mobiqa Airlines, Screenshot of website [Online], Retrieved from the Internet on Dec. 9, 2009 at http://www.mobiqa.com/airlines/?gclid=CLqyxOefyZ4CFWIr4wodbx7wrg, 3 pages.

Mulliner, C., "Attacking NFC Mobile Phones," 25th Chaos Communication Congress, Dec. 2008, Berlin, Germany, 71 pages.

Mulliner, C., "Vulnerability Analysis and Attacks on NFC-enabled Mobile Phones," 2009 International Conference on Availability, Reliability and Security, Institute of Electrical and Electronic Engineers (2009), pp. 695-700.

Newton's Telecom Dictionary, "Mixed Mode"—"MNA", CMP Books, Gilroy, CA, Jul. 2010, 1 page.

Shirali-Shahreza, M. et al., "Drawing CAPTCHA," 28th International Conference on Information Technology Interfaces ITI 2006, Jun. 19-22, 2006, Cavtat, Croatia, pp. 475-480.

Vamosi, R. et al., "Multi-Channel Authentication via Mobile Banking," Javelin Strategy & Research, Sep. 2009, 92 pages.

Weiss, M., "Performing Relay Attacks on ISO 14443 Contactless Smart Cards using NFC Mobile Equipment," Master's Thesis in Computer Science, University of Munich, Germany, May 17, 2010, 89 pages.

Wikipedia, "Mobile Payment," [Online], Retrieved on Jan. 20, 2010 at http://en.wikipedia.org/wiki/Mobile_payment, 6 pages.

* cited by examiner

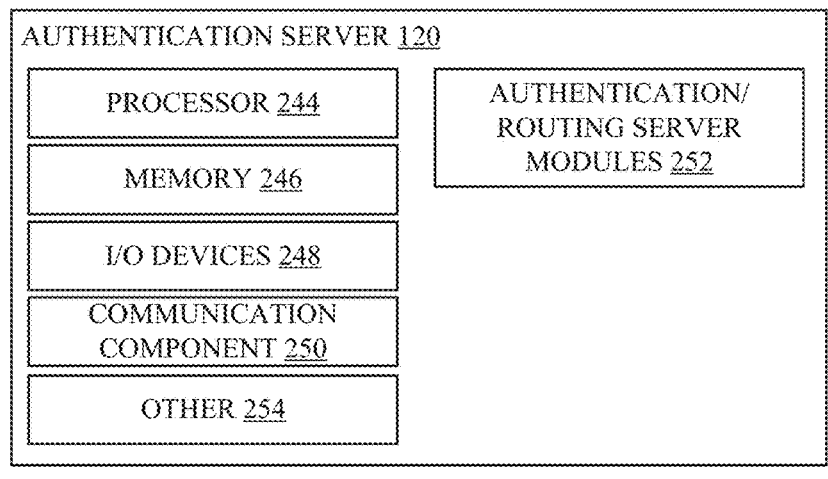

USER DEVICE(S) 102

PROCESSOR 124

MEMORY 126

TRUSTED PLATFORM MODULE 128

I/O DEVICES 130

CAMERA 132

DISPLAY 134

BIOMETRIC 141

OTHER 136

COMMUNICATION COMPONENT 138

CLIENT AUTHENTICATION MODULES 140

BIOMETRIC MODULE 151

LOCATION MODULE 142

OTHER 143

ADMIN/TRUSTED DEVICE(S) 110

PROCESSOR 224

MEMORY 226

TRUSTED PLATFORM MODULE 228

I/O DEVICES 230

CAMERA 232

DISPLAY 234

BIOMETRIC 235

OTHER 236

COMMUNICATION COMPONENT 238

ADMIN AUTHENTICATION MODULES 240

BIOMETRIC MODULE 241

LOCATION MODULE 242

OTHER 243

AUTHENTICATION SERVER 120

PROCESSOR 244

MEMORY 246

I/O DEVICES 248

COMMUNICATION COMPONENT 250

OTHER 254

AUTHENTICATION/ ROUTING SERVER MODULES 252

FIG. 2A

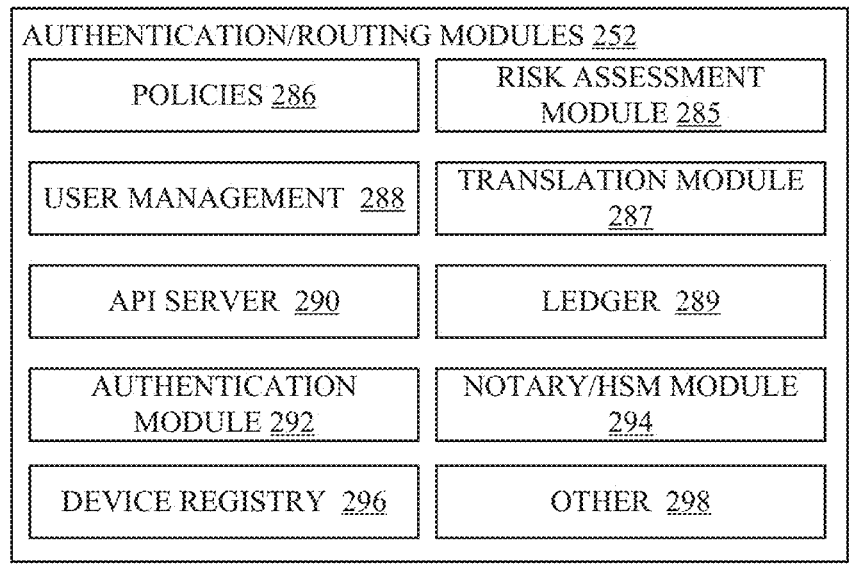

AUTHENTICATION MODULES 140/240

| USER INTERFACE 300 | BIOMETRIC MODULE 312 |
|---|---|
| ROUTING TRIGGER MODULE 302 | PROXIMITY MODULE 314 |
| DOMAIN NAME SERVER (DNS) MODULE 304 | TPM INTERACTION MODULE 316 |
| KEY INDICATION GENERATOR 308 | KEY INDICATION READER 310 |
| OTHER 330 | |

AUTHENTICATION/ROUTING MODULES 252

| POLICIES 286 | RISK ASSESSMENT MODULE 285 |
|---|---|
| USER MANAGEMENT 288 | TRANSLATION MODULE 287 |
| API SERVER 290 | LEDGER 289 |
| AUTHENTICATION MODULE 292 | NOTARY/HSM MODULE 294 |
| DEVICE REGISTRY 296 | OTHER 298 |

FIG. 2C

AUTHENTICATION SYSTEM

PRIORITY CLAIM

This application claims the benefit of U.S. Provisional
Patent Application No. 63/299,389, filed on Jan. 13, 2022,
titled, "AUTHENTICATION SYSTEM". The provisional
application is hereby incorporated by reference for all pur-
poses.

INCORPORATIONS

The following are incorporated by reference for all pur-
poses as if fully set forth herein:

Document 1—Trusted Computing Group, Incorporated,
"TPM 1.2 Main Specification," 2011.

Document 2—Trusted Computing Group, Incorporated,
"TPM 2.0 Main Specification," 2019.

Document 1 describes an industry standard of a Trusted
Platform Module.

Document 2 describes the latest version of an industry
standard of a Trusted Platform Module.

BACKGROUND

There are many online service and data providers online.
Many of these online service and data providers require that
a user be authenticated to use these services or access this
data. The typical way that a user authenticates with the
service or data provider is to log in with a username and
password.

The subject matter discussed in this section should not be
assumed to be prior art merely as a result of its mention in
this section. Similarly, a problem mentioned in this section
or associated with the subject matter provided as back-
ground should not be assumed to have been previously
recognized in the prior art. The subject matter in this section
merely represents different approaches, which in and of
themselves can also correspond to implementations of the
claimed technology.

BRIEF DESCRIPTION OF THE DRAWINGS

In the drawings, like reference characters generally refer
to like parts throughout the different views. Also, the draw-
ings are not necessarily to scale, with an emphasis instead
generally being placed upon illustrating the principles of the
technology disclosed. In the following description, various
implementations of the technology disclosed are described
with reference to the following drawings, in which:

FIG. 2A illustrates a block diagram of example devices
and servers.

FIG. 2C illustrates a block diagram of example authen-
tication modules.

DETAILED DESCRIPTION OF ILLUSTRATIVE EMBODIMENTS

The following discussion is presented to enable any
person skilled in the art to make and use the technology disclosed, and is provided in the context of a particular
application and its requirements. Various modifications to
the disclosed implementations will be readily apparent to
those skilled in the art, and the general principles defined
herein may be applied to other implementations and appli-
cations without departing from the spirit and scope of the
technology disclosed. Thus, the technology disclosed is not
intended to be limited to the implementations shown, but is
to be accorded the widest scope consistent with the prin-
ciples and features disclosed herein.

The typical method of authentication at a third-party
provider today involves the usage of a username and pass-
word. This method has a number of problems. First, a user
has to remember their username and passwords for each and
every provider. This is especially difficult as each provider
has a different password requirement (e.g., specific length,
special character requirements, numeric requirements, capi-
talization requirements, etc.). Providers also have different
username requirements (e.g., email, custom username,
length requirements, phone number, etc.). Second, there are
a number of security problems with transferring a username
and password across a network. If the username or password
are intercepted, the account may be compromised.

An alternative form of authentication is provided and
detailed below. This authentication involves the use of an
intermediary authentication server to complete authentica-
tion at the third-party provider. Rather than sending a
username and password between a user device and the
third-party provider, the user device authenticates with the
authentication server. The authentication server then authen-
ticates the user device with the third-party provider. In some
implementations, a username and password are not sent
between the user device and the authentication server.
Rather, in some implementations, the authentication
between the user device and the authentication server
involves a hardware-based security module of the user
device, such as a Trusted Platform Module (TPM).

Prior to this authentication, the authentication server can
utilize a trusted or admin device to onboard the user device.
This onboarding adds another layer of security to the authen-
tication process. In one implementation, the user device
shares a public key from its TPM to the admin device, the
admin device then sends this public key to the authentication
server where it is stored in conjunction with other data
related to the user device (e.g., the user, associated user-
names, passwords, authentication tokens, etc.).

Figure 1:
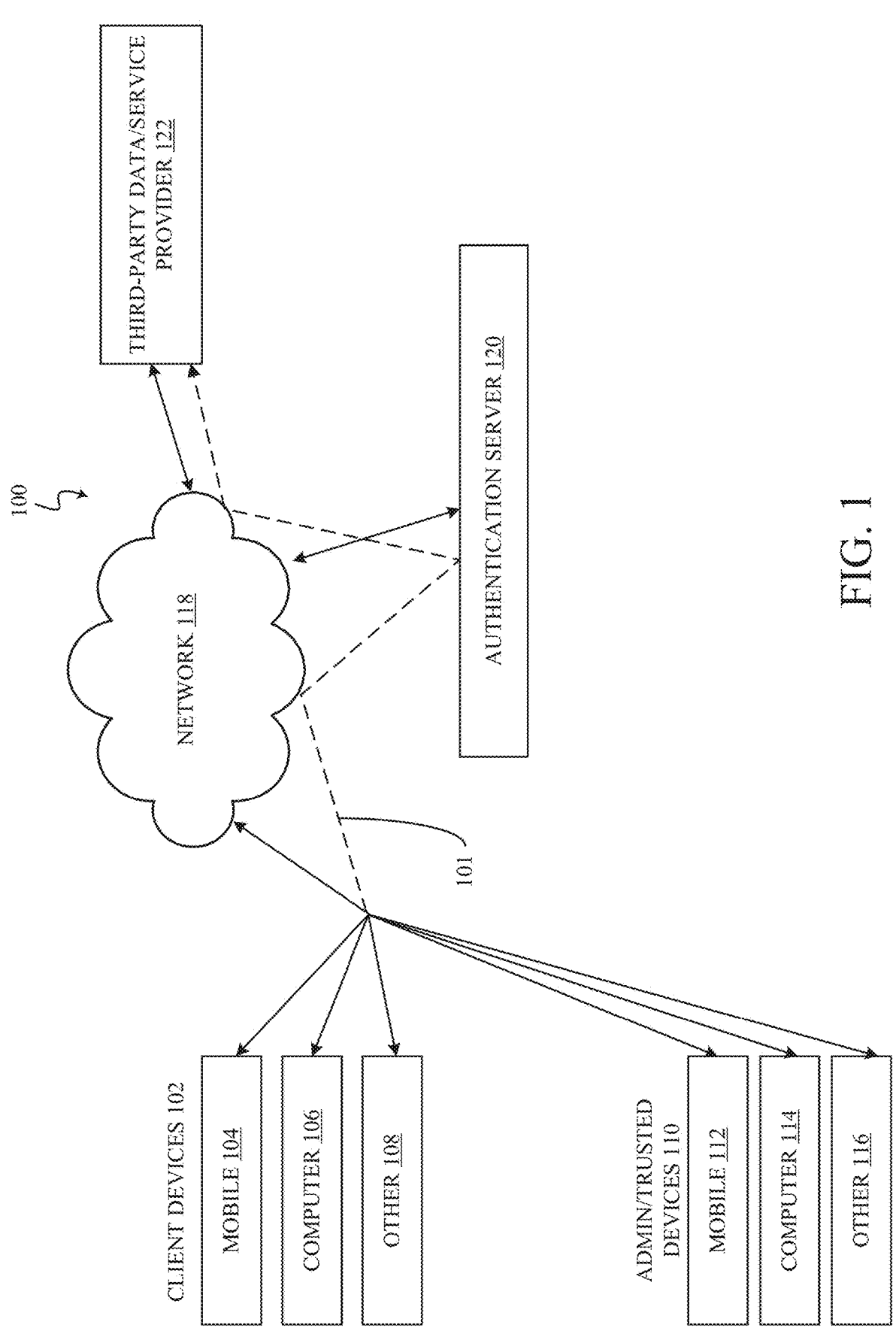
FIG. 1 illustrates a block diagram of an example com-
puting environment.

FIG. 1 illustrates a block diagram of an example com-
puting environment 100. Environment 100 includes client
devices 102, admin/trusted devices 110, authentication
server 120, and third-party data/service providers 122, that
communicate with one another over a network 118. a user of
client devices 102 may desire to log into a third-party
data/service provider 122. Client devices 102 can include
mobile devices 104 such as cellular phones and tablets.
Client devices 102 can also include computers 106 such as
laptops, desktops, or workstations. Client devices 102 can
include other devices as well, as indicated by block 108.
Admin/trusted devices 110 can include mobile devices 112
such as cellular phones and tablets. Admin/trusted devices
110 can also include computers 114 such as laptops, desk-
tops, or workstations. Admin/trusted devices 110 can
include other devices as well as indicated by block 116.

Examples of common third-party data/service providers
122 today include YouTube™, Facebook™, JSTOR™,
VKontakte™, Azure™, Twitter™, Google™, LinkedIn™,
Wikipedia™, Yahoo™, Baidu™, Amazon™, MSN™, Pin-
terest™, Taobao™, Instagram™, Tumblr™, eBay™, Reddit™, IMDb™, Netflix™, PayPal™ Imgur™ Snapchat™, Yammer™, Skype™, Slack™, HipChat™, Confluence™, TeamDrive™, Taskworld™, Chatter™, Zoho™, Prosper-Works™, Google's Gmail™, Salesforce.com™, Box™, Dropbox™, Amazon AWS™, Microsoft Office 365™, Workday™, Oracle on Demand™, Taleo™, Jive™, and Concur™.

This communication over network 118 typically involves the transfer of a password and username. The transfer of a username and password allows for potential security issues and also requires a user to remember their username and password.

Therefore, in one implementation, illustrated by line 101, authentication server 120 acts as an intermediary between client devices 102 and third-party data/service providers 122. Authentication server 120 can store a database of users and client devices (corresponding to client devices 102). Authentication server 120 can verify the client device 102 and log the client device 102 into the third-party data/service provider 122. In one implementation, authentication server 120 communicates with a trusted platform module of the client devices 102 to verify and authenticate the client device 102.

Authentication server 120 can communicate with the TPM to remove the necessity of using a password. Rather, the authentication server 120 sends a challenge to the TPM to verify that the TPM/user device possesses the private key. Upon confirmation that the client device 102 is in possession of the private key, authentication server 120 authenticates client device 102 with the third-party data/service provider 122. In some implementations, authentication server 120 authenticates with third-party data/service provider 122 via a different form of authentication than from client device 102 to authentication server 120. Therefore, authentication server 120 completes a form of authentication object translation.

Authentication server 120 stores client devices 102 in its database after being on-boarded by an admin/trusted device 110. In one implementation, admin/trusted devices 110 are former client devices 102. In one implementation, client devices 102 share their public key with admin/trusted devices 110 which onboard the client devices 102 into authentication server 120 using the public key. In some implementations, after a client device 102 is on boarded, it becomes an admin/trusted device 110 such that it can onboard other devices. In other implementations, admin/trust devices 110 have granularity in their privileges such that only a subset of admin/trusted devices 110 can onboard other client devices 102.

Authentication server 120 can periodically challenge the device 102/110 during communications between the device 102/110 and third-party data/service providers 122. This way, the security of a connection over an extended period of time can be reassured. The intervals at which authentication server 120 challenges the devices can be determined based on the sensitivity of the connection, user or organization preference, etc.

FIG. 2A illustrates a block diagram of example devices 102, 110 and server(s) 120. As shown, devices 102 and device 110 are similar. However, in other implementations, client devices 102 and admin/trusted device 110 can be different types of devices.

As shown, client device 102 includes processor 124, memory 126, trusted platform module 128, input/output devices 130, communication component 138, client authentication modules 140, biometric module 151, location module 142, and can include other items as well as indicated by block 143. Processor 124 and memory 126 can include a variety of different processors, graphics processing units and volatile and non-volatile memory devices. Processor 124 include a one or more processors capable of running computer instructions. Memory 126 can include a variety of different memory components to store and execute different care instructions.

Trusted platform module 128 is a hardware security module capable of storing public and private keys as well as processing various encryption or authentication processes. An example TPM 128 is described in greater detail below with respect to FIG. 2B. In some examples, TPM 128 includes a simulated or virtual TPM.

Input/output devices 130 include a camera 132, a display 134, and biometric module 151, and can include other items as well as indicated by block 136. Camera 132 can include a variety of different optical sensing optical sensors. For example, camera 132 can include an optical sensor that senses visible light, infrared light, you've ultraviolet light, etc. In implementations where client device 102 is a cellular device, camera 132 can include one or more front-facing or back-facing cameras.

Display 134 can include a variety of different display mechanisms that generate an image. Display 134 for example, can include an LED display, a cathode ray tube (CRT), a flat-panel device such as a liquid crystal display (LCD), a projection device, or some other mechanism for creating a visible image. In implementations where client device 102 is a cellular device, display 134 can include the main phone display/touchscreen.

Biometric device 141 can include a variety of different biometric devices that sense the biometrics of a user. For example, biometric device 141 can include one or more devices configured for DNA recognition, ear recognition, iris scanning, retina recognition, face recognition, fingerprinting, finger geometry recognition, hand geometry, odor recognition, vascular recognition, behavioral identifier recognition, gait recognition, keystroke recognition, voice biometrics, signature recognition, etc. Biometric devices 141 can include other items as well as indicated by 136, for example, input/output devices 130 can include a microphone, a keyboard, a touchscreen, lame mouse, etc.

Communication components 138 can include a variety of different components configured to facilitate communication between client device 102 and other computing devices. For example, communication component 138 can include devices that allow for communication over a network such as the LAN (local area network), WAN (wide area network), telephone network (Public Switched Telephone Network (PSTN), Session Initiation Protocol (SIP), wireless network, Near-field communication network, point-to-point network, star network, token ring network, hub network, Internet, inclusive of the mobile Internet, via protocols such as EDGE, 3G, 4G LTE, Wi-Fi and WiMAX.

Client authentication modules 140 allow for the authentication of client device 102. Client authentication modules 140 can include a variety of different hardware and software components. Client authentication modules 140 will be described in greater detail below with respect to FIGS. 2C, 3A-B and 4.

Location module 142 includes components that can sense and determine the location of client device 102. For example, location module 142 can include a variety of different software and hardware components that determine the location of client device 102. For example, location module 142 can include a GPS module, Wi-Fi module, Bluetooth module or other hardware components. The signals generated by the hardware components/sensors can be processed to geolocate client device 102. Geolocation can include global geolocation or a more local form of geolocation. For instance, the output of geolocation can include a GPS location. Or for instance, the output of geolocation can include the distance from another device.

As shown, admin/trusted device(s) 110 includes processor 224, memory 226, trusted platform module 228, input/output devices 230, communication component 238, admin authentication modules 240, biometric module 241, location module 242, and can include other items as well as indicated by block 243. Processor 224 and memory 226 can include a variety of different processors, graphics processing units and volatile and non-volatile memory devices. Processor 224 include a one or more processors capable of running computer instructions. Memory 226 can include a variety of different memory components to store and execute different care instructions.

Trusted platform module 228 is a hardware security module capable of storing public and private keys as well as processing various encryption or authentication processes. An example TPM 228 is described in greater detail below with respect to FIG. 2B.

Input/output devices 230 include a camera 232, a display 234, and biometric module 241, and can include other items as well as indicated by block 236. Camera 232 can include a variety of different optical sensing optical sensors. For example, camera 232 can include an optical sensor that senses visible light, infrared light, you've ultraviolet light, etc. In implementations where device 110 is a cellular device, camera 132 can include one or more front-facing or back-facing cameras.

Display 234 can include a variety of different display mechanisms that generate an image. Display 234 for example, can include an LED display, a cathode ray tube (CRT), a flat-panel device such as a liquid crystal display (LCD), a projection device, or some other mechanism for creating a visible image. In implementations where device 110 is a cellular device, display 234 can include the main phone display/touchscreen.

Biometric device 241 can include a variety of different biometric devices that sense the biometrics of a user. For example, biometric device 241 can include one or more devices configured for DNA recognition, ear recognition, iris scanning, retina recognition, face recognition, fingerprinting, finger geometry recognition, hand geometry, odor recognition, vascular recognition, behavioral identifier recognition, gait recognition, keystroke recognition, voice biometrics, signature recognition, etc. Biometric devices 241 can include other items as well as indicated by 236, for example, input/output devices 230 can include a microphone, a keyboard, a touchscreen, lame mouse, etc.

Communication components 238 can include a variety of different components configured to facilitate communication between client device 102 and other computing devices. For example, communication component 238 can include devices that allow for communication over a network such as the LAN (local area network), WAN (wide area network), telephone network (Public Switched Telephone Network (PSTN), Session Initiation Protocol (SIP), wireless network, Near-field communication network, point-to-point network, star network, token ring network, hub network, Internet, inclusive of the mobile Internet, via protocols such as EDGE, 3G, 4G LTE, Wi-Fi and WiMAX.

Admin authentication modules 240 allow for the authentication of admin/trusted device 110. Admin authentication modules 240 can include a variety of different hardware and software components. Admin authentication modules 240 will be described in greater detail below with respect to FIGS. 2C, 3A-B and 4.

Location module 242 includes components that can sense and determine the location of device 110. For example, location module 242 can include a variety of different software and hardware components that determine the location of device 110. For example, location module 242 can include a GPS module, Wi-Fi module, Bluetooth module or other hardware components. The signals generated by the hardware components/sensors can be processed to geolocate device 110. Geolocation can include global geolocation or a more local form of geolocation. For instance, the output of geolocation can include a GPS location. Or for instance, the output of geolocation can include the distance from another device.

Biometric module 241 includes components that can complete biometric operations. Biometric operations can include biometric identification, biometric confirmation, etc. Biometric identification uses sensor signals from biometric devices 235 identifies a user by their biometric characteristics. Biometric confirmation can use other sensors to verify that the biometric is not being imitated. For example, biometric confirmation can take a temperature reading to ensure the fingerprint corresponds to a proper finger temperature. Or for example, biometric confirmation can take a second biometric reading from the user and confirm the first reading is to the same user.

Authentication server 120 includes processor 244, memory 246, input/output device(s) 248, communication component 250, authentication/routing server modules 252, and can include other items as well, as indicated by block 254. Processor 244 and memory 246 can include a variety of different processors, graphics processing units and volatile and non-volatile memory devices. Processor 244 include a one or more processors capable of running computer instructions. Memory 246 can include a variety of different memory components to store and execute different care instructions. Input/output devices 248 include a variety of different devices that a user or other devices can use to interact with, send and/or receive data from, authentication server 120. Communication components 250 can include a variety of different components configured to facilitate communication between authentication server 120 and other computing devices. For example, communication component 250 can include devices that allow for communication over a network such as the LAN (local area network), WAN (wide area network), telephone network (Public Switched Telephone Network (PSTN), Session Initiation Protocol (SIP), wireless network, Near-field communication network, point-to-point network, star network, token ring network, hub network, Internet, inclusive of the mobile Internet, via protocols such as EDGE, 3G, 4G LTE, Wi-Fi and WiMAX. Authentication/routing server modules 252 are used to complete authentication which will be explained in greater detail below.

Figure 2B:
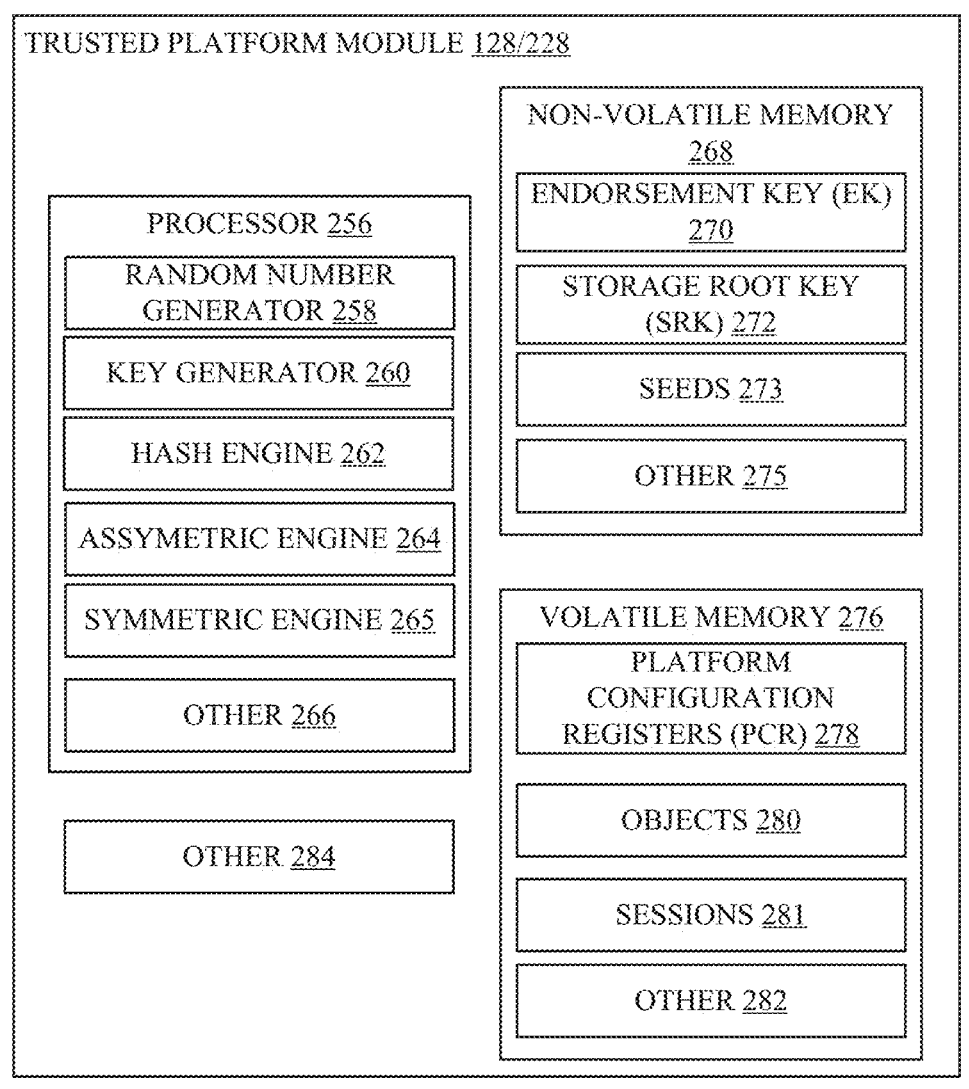
FIG. 2B illustrates a block diagram of an example trusted
platform module.

FIG. 2B illustrates a block diagram of an example trusted platform module 128, 228, collectively referred to as TPM 128. In some implementations, TPM 128 conforms the specifications incorporated by reference with this application. TPM 128 includes protected capabilities, which are operations performed by TPM 128 on data in a shielded location in response to a command sent to TPM 128. A shielded location on TPM 128 is a location that contains data that is shielded or isolated from access by any entity other than TPM 128 and which may be operated on only by a protected capability. Trusted platform module 128 includes processors 256, non-volatile memory 268 and volatile memory 276 and can include other items as well indicated by block 284. Processors 256 include random number generator 258, key generator 260, hash engine 262, asymmetric engine 264, symmetric engine 265, and can include other items as well, as indicated by block 266.

Random number generator 258 is the source of randomness in TPM 128. TPM 128 uses random values in key generation and for randomness in signatures. Random number generator 258 is a protected capability. It nominally consists of an entropy source and collector, a state register, and a mixing function (typically, a hash function). The entropy collector collects entropy from entropy sources and removes bias. TPM has at least one internal source of entropy, and possibly more. These sources could include noise, clock variations, air movement, and other types of events. The collected entropy is then used to update the state register providing input to the mixing function to produce the random numbers.

Key generator 260 produces keys for use by TPM 128. In one implementation, there are two different types of keys. The first, an ordinary key, is produced using random number generator 258 to seed the computation. The result of the computation is a secret key value kept in a shielded location. The second type, a Primary Key, is derived from a seed value, not the random number generator 258 directly. The RNG usually generates the seed that is persistently stored on the TPM. In one implementation, key generator 260 may generate a key by using bits from random number generator 258 or deriving the key from another secret value. There are many ways to generate keys and TPM 128 can utilize one or more of these methods.

Hash engine 262 completes hash functions. Hash functions may be used directly by external software or as the side effect of many operations of TPM 128. TPM 128 uses hashing to provide integrity checking and authentication as well as one-way functions, as needed.

Asymmetric engine 264 completes asymmetric operations, asymmetric algorithms for attestation, identification, and secret sharing. TPM 128 may support any asymmetric algorithm to which the Trusted Computing Group (TCG) has assigned an identifier. An asymmetric algorithm identifier will indicate a family of algorithms and methods that are used with that algorithm. Some examples of asymmetric algorithms are Rivest-Shamir-Adleman (RSA) and elliptic-curve cryptography (ECC) using prime curves.

Symmetric engine 265 completes symmetric operations. Symmetric operations include symmetric encryption. Symmetric encryption to encrypt some command parameters (typically, authentication information) and to encrypt objects stored outside of TPM 128. Both symmetric engine 265 and asymmetric engine 264 can complete signature operations.

Non-volatile memory 268 includes endorsement key (EK) 270, seeds 273, and can include other items as well as indicated by block 275. The NV memory module stores persistent state associated with the TPM. Some NV memory is available for allocation and use by the platform and entities authorized by an owner of TPM 128. TPM NV memory contains Shielded Locations and Shielded Location can only be accessed with Protected Capabilities.

Endorsement key 270 is a form of asymmetric alias derived from a common seed. Each seed value and its aliases should be statistically unique to TPM 128. That is, the probability of two TPMs 128 having the same EK 270 should be insignificant. The seed may be used to generate multiple asymmetric keys, all of which would represent the same TPM 128. Seeds 273 are typically large random numbers that TPM 128 (e.g., random number generator 258) generates. These seeds are never exposed outside a shielded area of TPM 128. These seeds are the starting value from which keys are generated.

Volatile memory 276 includes platform configuration registers (PCR) 278, objects 280, sessions 281 and can include other items as well as indicated by block 282. PCR are Shielded Locations used, for example, to validate the contents of a log of measurements. One example of nominal behavior of a trusted platform is to maintain, in a log, a record of the events that affect the security state of the platform. When additions are made to the log, TPM 128 receives a copy of the log entry or the digest of data described by the log. The data sent to TPM 128 is included in an accumulative hash in PCR 278. TPM 128 may then provide an attestation of the value in PCR 278, which, in turn, verifies the contents of the log. It is possible for a single PCR 278 to record all log entries. However, this would make it difficult to evaluate the different stages of platform evolution as it boots into the operating system. Normally, multiple PCR 278 are provided in TPM 128 to allow simplification of the evaluation. PCR 278 may also be used to gate access to an object.

PCR 278 need not be maintained in random access memory. They may be kept in non-volatile memory. If kept in non-volatile memory, consideration must be made for the possible impact on TPM 128 performance during the critical boot phase, when many measurements are recorded. TPM 128 is required to implement a PCR bank for each supported algorithm. However, a PCR bank may be defined such that it contains no PCR 278. TPM 128 may support Resume PCR that retain their state across a TPM Resume sequence but are set to their default initial value on TPM Reset or TPM Restart.

Objects 280 include keys and data that are loaded into TPM 128 from external memory. The structure used for keys may be generalized for use on data objects if the access properties used for keys are suitable for access to these objects.

Session store 281 stores session information. TPM 128 uses sessions to control a sequence of operations. A session may audit actions, provide authorizations for actions, encrypt parameters passed in commands, etc. A session may be created as needed. The session is assigned a handle at that time. TPM 128 may be designed so that the RAM used for sessions is from a memory pool shared with the object store 280. It may also be designed so that the session store 281 and object store 280 are separated and dedicated.

FIG. 2C illustrates a block diagram of example authentication modules 140, 240, 252. Authentication modules 140, 240, 252 can complete authentication operations across a variety of different protocols including, but not limited to, Fast Identity Online (FIDO), Challenge-Handshake Authentication Protocol (CHAP), Extensible Authentication Protocol (EAP), Transport Layer Security (TLS), Authentication and Key Agreement (AKA), Basic access authentication, CAVE-based authentication, CRAM-MD5, Digest, Host Identity Protocol (HIP), LAN Manager, NT LAN Manager, OpenID protocol, Password-authenticated key agreement protocols, Protocol for Carrying Authentication for Network Access (PANA), Secure Remote Password (SRP), RFID-Authentication Protocols, Woo Lam 92 (protocol) SAML). Authentication modules 140,240, collectively referred to as authentication module 140. Authentication module 140 includes user interface 300, routing trigger module 302, domain name server (DNS) module 304, TPM interaction module 316, key indication generator 308, biometric module 312, proximity module 314, key indication generator 308, key indication reader 310, and can include other items as well as indicated by block 330.

User interface module 300 generates graphical user interfaces and handles inputs/outputs to and from a user. Routing trigger module 302 triggers communication re-routing based on trigger criteria. The trigger criteria of routing trigger module 302, in one implementation, is a specific third-party server location or identifier. For example, a communication to the third-party server triggers a routing to the authentication server. The trigger criteria, in another implementation, is the using of a specific application. For example, routing trigger module 302 may trigger a re-routing to the authentication server based on a user accessing a specific application on their mobile device. In other implementations, the trigger criteria can include other items as well.

Domain name server (DNS) module 304 handles DNS related operations. In one implementation, the re-routing of a communication is completed via a DNS interception. When a user attempts to retrieve an Internet Protocol (IP) address of a specific domain name the standard DNS request to the user's default DNS is intercepted by DNS module 304. The standard DNS response (which typically would contain an IP corresponding to the domain name) is replaced by an IP address corresponding to one or more authentication server 120.

TPM interaction module 316 handles interactions with TPM 128/228. For instance, TPM interaction module 316 facilitates asymmetric operations, such as private key possession challenges, with TPM 128/228.

Key indication generator 308 generates an indication of one or more keys. For instance, key indication generator 308 generates a visual image indicative of a public key. In one example, the visual image could include a QR-code. Key indication generator 308, in another implementation, generates an auditory indication of the public key. Key indication generator 308, in another implementation, generates a communication signal indicative of the public key. In some implementations, the communication signal is local such that another device must be in close proximity to the generating device to detect the signal.

Key indication reader 310 reads an indication of a key and can derive the key based on the indication. For example, key indication reader 310 uses a camera to scan a QR code, it then identifies and converts the QR image into a public key. Or for example, key indication reader 310 uses a microphone to sense an auditory indication of the public key. Key indication reader 310 then converts the auditory indication into the public key. Key indication reader 310 can also receive the public key over a communication protocol (e.g., NFC, Bluetooth, RC-5, etc.).

Biometric module 312 is used for various biometric operations. Biometric operations can include biometric identification of a user. Biometric identification of a user can include DNA recognition, ear recognition, iris scanning, retina recognition, face recognition, fingerprinting, finger geometry recognition, hand geometry, odor recognition, vascular recognition, behavioral identifier recognition, gait recognition, keystroke recognition, voice biometrics, signature recognition, etc.

Proximity module 314 can be used for determining the location of a device. Proximity module 314 determines the location of the device globally. Proximity module 314 can also or in the alternate determine the location of a device relative to other devices. In some implementations, proximity module 314 for user confirmation through common location of multiple devices owned by the user.

Authentication/routing modules 252 includes policies 286, user management 288, API server 290, authentication module 292, device registry 296, risk assessment module 285, translation module 287, ledger 289, notary/HSM module 294, and can include other items as well, as indicated by block 298.

Policies 286 specify authentication settings for different sets of users and configurations in various organizations. Some settings include the required re-authentication interval, biometric requirements, device requirements, etc. Policies 286 can also define sets of authentication procedures.

User management module 288 include modules to manage users. For example, user management module 288 can create, modify or delete user data such as usernames and passwords. User management module 288 can also store permissions for various users or groups of users. For example, some users may have permissions to onboard their own devices, but not other user devices. Or for example, some users can onboard any applicable device. Permissions can be used for other purposes as well.

API server 290 includes a software interface that offers functions, classes, etc. to external software applications. In some implementations, third-party data/service providers 122 can implement functions on authentication server 120 using API server 290.

Authentication module 292 includes components that authenticate a user device with a third-party data/service providers 122. Authentication module 292 verifies and authenticates the user device. Authentication module 292 also authenticates with the third-party data/service provider 122. Authentication module 292 can store various authentication objects (e.g., tokens, cookies, certificates, etc.). Authentication module 292

Translation module 287 works in conjunction with authentication module 292 to "translate" the authentication objects between the device and authentication server 120 to the authentication certificate between the authentication server 120 and third-party data/service provider 122. For example, the type of authentication between a client device and authentication server 120 may remain the same, but the type of authentication between third-party providers can vary based on the provider. Regardless of the type of authentication required between third-party providers and authentication server 120, translation module 287 can "translate" the client authentication object by generating a corresponding third-party provider authentication object.

Risk assessment module 285 assesses the risk of various authentication operations and determines a policy from policies 286 that should be used based on the assessed risk. Risk assessment module 285 can determine the risk based on the sensitivity of the data being transferred, the users involved, the devices involved, the third-party provider involved, user or organization settings, etc.

Device registry 296 stores various information corresponding to devices in contact with authentication server 120. Device registry 296 in some examples, stores device ID's for various devices in contact with authentication server 120. A public key of each device can also be stored in association with the device ID and other device information. Other device information can store many different items including, but not limited to, biometric sensors, typical locations, MAC addresses, typical users, device model, device brand, etc.

Ledger 289 can include a digital ledger of transactions. In some implementations, ledger 289 can include distributed ledger technology. In one implementation, the ledger contains mechanisms to facilitate a blockchain network. Interactions with authentication server can be stored in a ledger utilizing blockchain or otherwise.

Figure 3A:
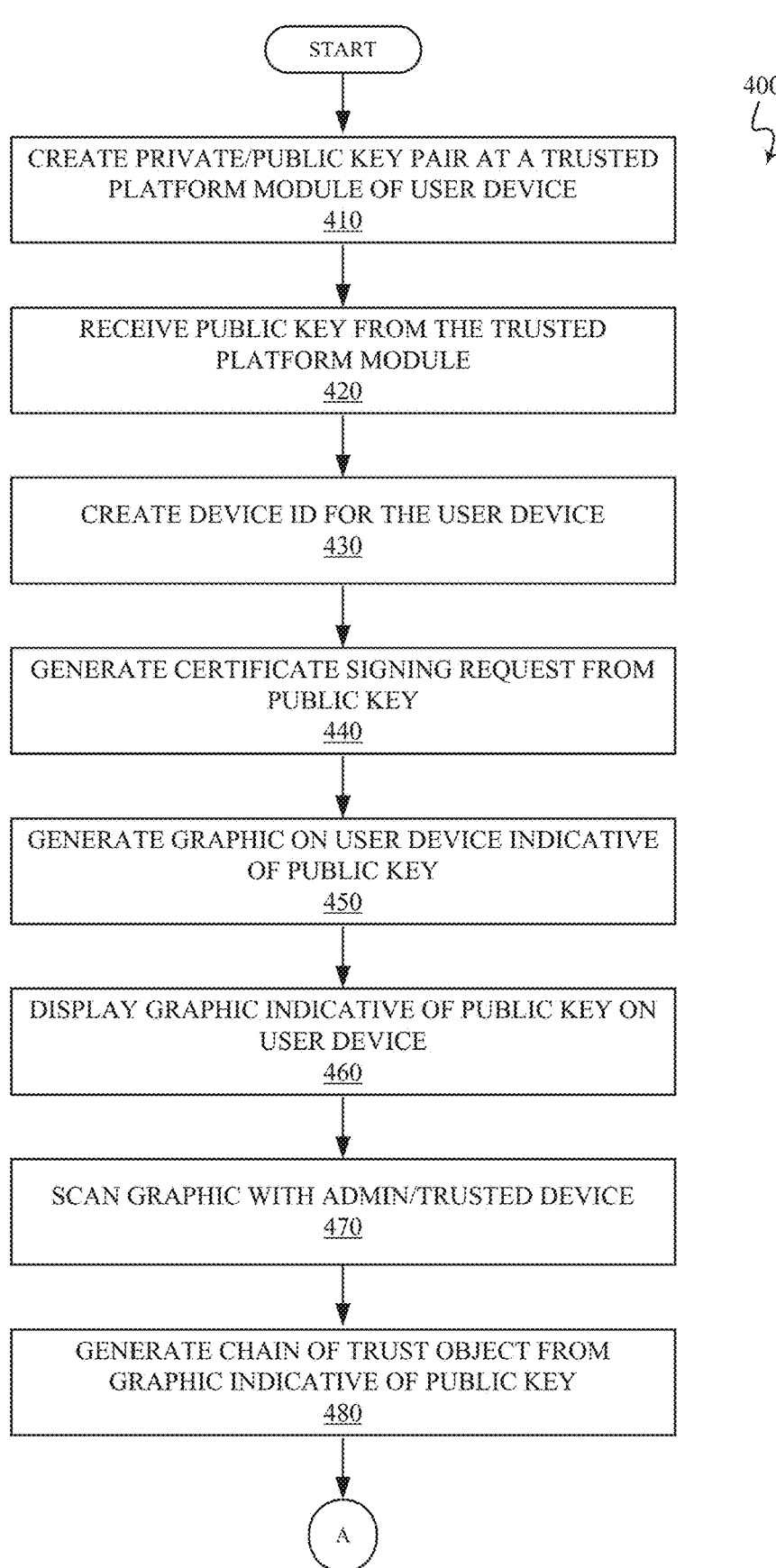
FIGS. 3A-3B illustrates a flow diagram showing an
example onboarding operation.
Figure 3B:
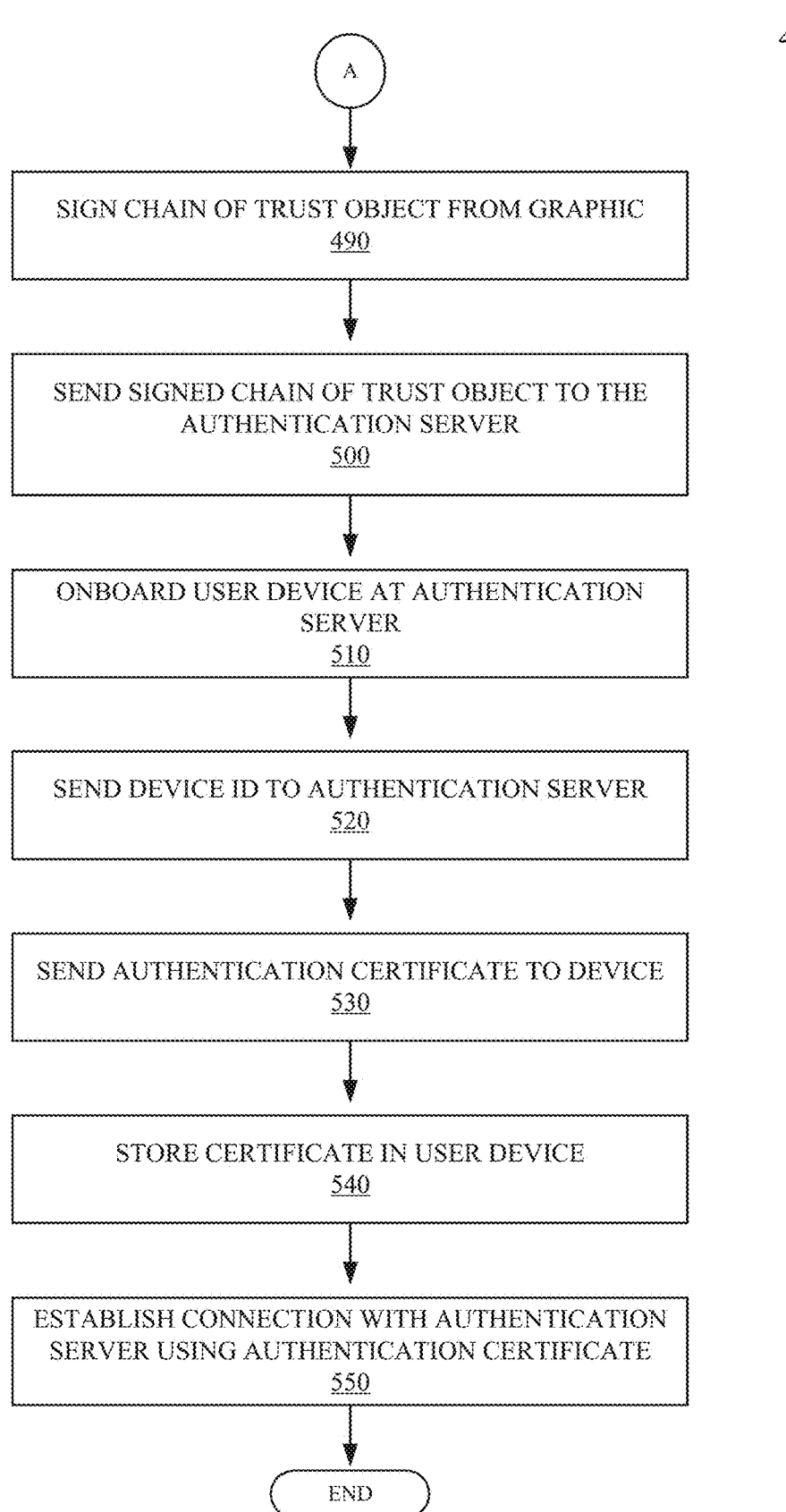

FIGS. 3A-B illustrates a flow diagram showing an example onboarding operation 400. Operation 400 begins at block 410 where a private/public key pair are generated on the user device. In one implementation, the private/public key pair are generated in TPM 128/228 of the device. The private key remains in TPM 128, and the public key is distributable to other computing systems.

Operation 400 proceeds at block 420 where the public key is transferred from the TPM. The public key can then be transferred from the device. Block 420 is optional and is only implemented when the public key is generated at TPM 128.

Operation 400 proceeds at block 430 where a device ID for the user device is created. The device ID can be generated or retrieved from a location on the device. In some implementations, the device ID is assigned at the creation of the device. In other implementations, the device ID is assigned at a later time, for example, during the first onboarding of the device.

Operation 400 proceeds at block 440 where a certificate signing request is generated from the public key. Operation 400 proceeds at block 450 where an indication of the public key is generated. In one implementation, the indication of the public key includes a QR code that is indicative of the public key. In other implementations, the indication of the public key can include other items as well. For example, the indication can include other graphic codes, audio codes, etc.

Operation 400 proceeds at block 460 where the indication of the public key is presented. In one implementation where the indication of the public key is a QR code, the QR code is displayed on a screen of the device. In other implementations, the indication is presented in other ways. For example, the indication can be displayed on a screen, the indication can be transmitted via a wireless protocol, the indication can be played from a speaker, etc.

Operation 400 proceeds at block 470 where the indication of the public key is sensed by an admin/trusted device. In one implementation where the indication of the public key is a QR code, the admin/trusted device utilizes a camera to sense the QR code displayed on the screen of the other user device. In other implementations, the admin/trusted device utilizes a sensor that corresponds to the means in which the user device presents the indication of the public key.

Operation 400 proceeds at block 480 where a chain of trust object corresponding to the public key is generated. Operation 400 proceeds at block 490 where the chain of trust object is signed by the admin device. Operation 400 proceeds at block 500 where the signed chain of trust object is sent to the authentication server. Operation 400 proceeds at block 520 where the user device ID is sent to the authentication server and the user device is onboarded at the authentication server. The user device ID corresponds to the chain of trust object and is associated with the public key and other stored information corresponding to the user device.

Operation 400 proceeds at block 530 where the authentication certificate is sent to the client device. In one implementation, the authentication certificate is sent to the user device via the admin/trusted device. In another implementation, the authentication certificate is sent from the authentication server to the client device. Operation 400 proceeds at block 540 where the authentication certificate is stored in the client device. In some implementations, the authentication certificate/object can be stored on TPM 128 of the client device.

Operation 400 proceeds at block 550 where a connection between the user device and authentication server 120 is created. Client device 102 can send an indication of the authentication certificate and/or proof of possession of a private key to authentication server 120. Once client device 102 is connected and authenticated with authentication server 120, authentication server 120 can authenticate client device 102 with one or more third-party providers. An example of this authentication is shown in FIG. 4.

Figure 4:
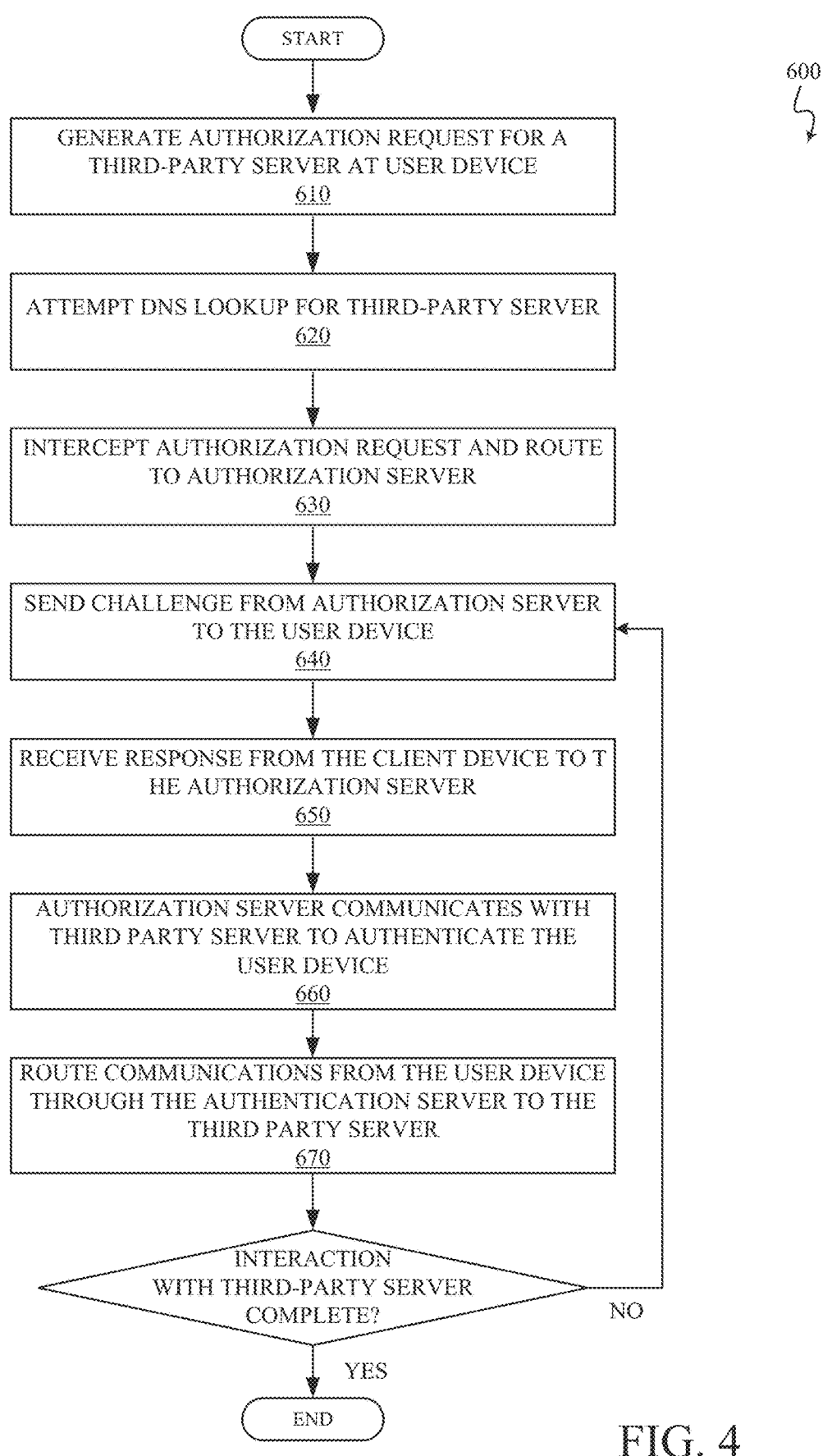
FIG. 4 illustrates a flow diagram showing an example
authentication operation.

FIG. 4 illustrates a flow diagram showing an example authentication operation 600. Authentication operation 600 begins at block 610 where the authorization request for a third-party provider is generated at the user device. Operation 600 proceeds at block 620 where the authorization request is sent. In one implementation, the sending of an authorization request involves an IP address lookup for the third-party provider through a domain name server (DNS).

Operation 600 proceeds at block 630 where the authorization request is intercepted and re-routed to authentication server 120. In one implementation, the IP address lookup through a DNS is blocked and the typical DNS response containing the third-party provider IP is replaced with a response containing the IP to the authentication server 120. the authorization request can be intercepted in other ways as well, for example, by installing a browser extension or a mobile app.

Operation 600 proceeds at block 640 where a challenge is sent from the authorization server to the user device. In one implementation, the challenge involves challenging if the user device (or TPM thereof) possesses the private key. In one implementation, the challenge involves determining if the device is proximate another device known to be in possession of the given user. For instance, if the challenged device is a specific user's phone and that phone is proximate (i.e., within some proximity threshold) the user's computer, smart watch and/or other device, then the proximity challenge is overcome. In one implementation, the challenge involves a biometric challenge to determine if the user's biometric features match a stored biometric profile. In some implementations, more than one challenge may be used at block 640.

Operation 600 proceeds at block 650 where a response from the challenge is received at authentication server 120. Authentication server 120 verifies that the one or more challenges are overcome. Authentication server 120 can generate an authentication object (e.g., a certificate) In response, to the challenges being overcome, operation 600 proceeds at block 660.

At block 660 the authentication server communicates with the third-party data/service provider 122 to authenticate the user device. The authentication process can vary with different third-party data/service providers 122. Regardless of the authentication process by third-party data/service providers 122, the authentication process (e.g., in blocks 640-650) can remain the same between authentication server 120 and devices 102, 110.

Operation 600 proceeds at block 670 where communications from the user device to the third-party data/service provider 122 are rerouted or proxied through authentication server 120 or another proxy. In some implementations, only the authentication process is routed through authentication server 120.

At block 680 it is determined whether the interaction with the third-party data/service provider 122 is complete. If the interaction with the third-party data/service provider 122 is complete then operation 600 ends. If the interaction with third-party data/service provider 122 is not complete, then the authentication procedure can repeat, beginning at block 640. This repetition can be repeated periodically to ensure that authentication is valid throughout a longer interaction. The authentication repetition can be repeated at intervals of a given length of time. The given length of time can, in one implementation, be based upon an assessment of risk or importance/sensitivity of the interaction.

Figure 5:
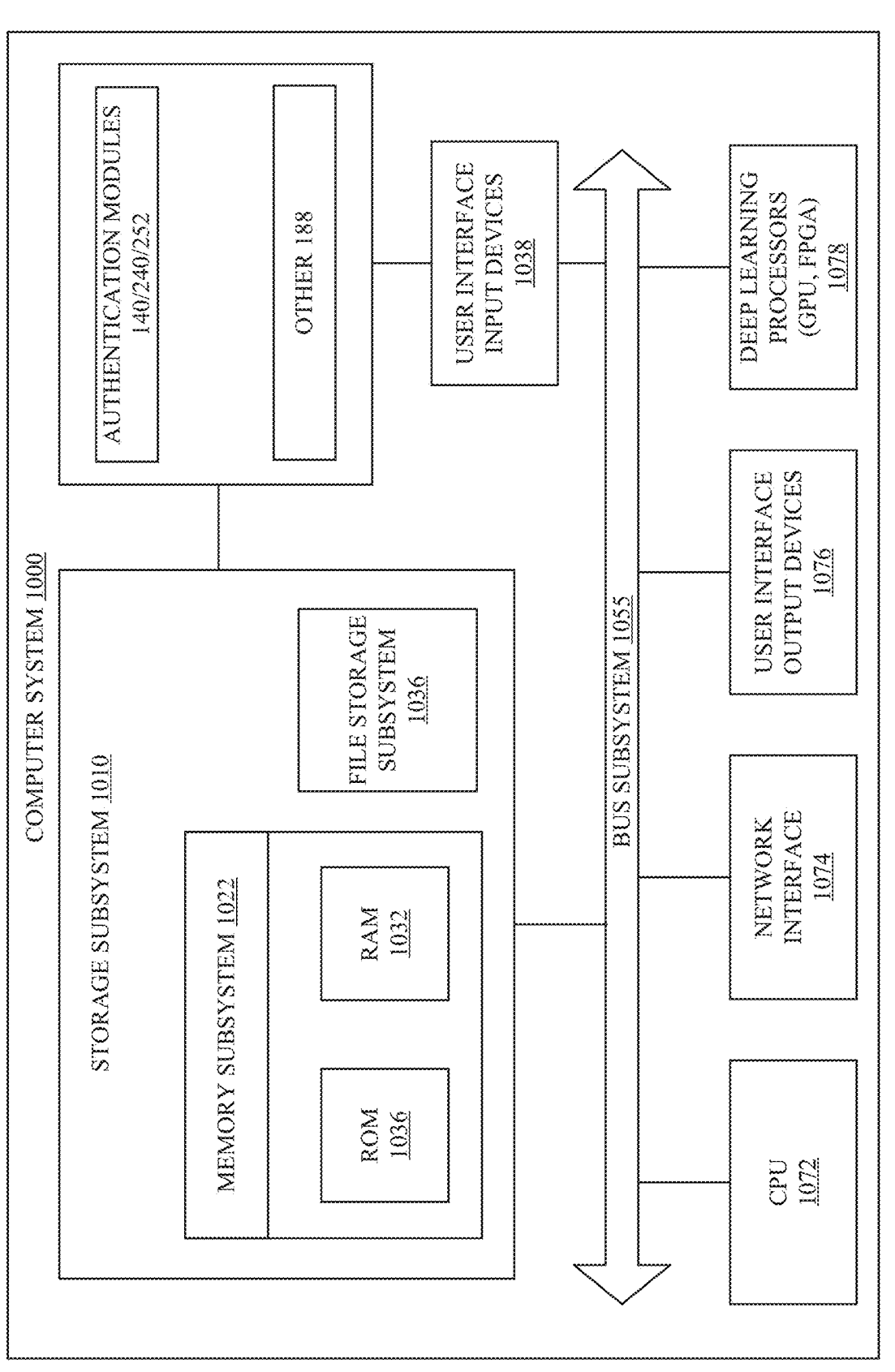
FIG. 5 illustrates a block diagram showing an example
computing system.

FIG. 5 is a computer system 1000 that can be used to implement the systems and operations disclosed herein. In some implementations, device 102, device 110, server 120 and/or providers 122 include one or more computer systems 1000 and/or parts thereof. Computer system 1000 includes at least one central processing unit (CPU) 1072 that communicates with a number of peripheral devices via bus subsystem 1055. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, the authentication modules 140/ 240/252 is communicably linked to the storage subsystem 1010 and the user interface input devices 1038. In other implementations, the authentication modules 140/240/252 can be coupled to other components as well.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. These software modules are generally executed by deep learning processors 1078.

Deep learning processors 1078 can include graphics processing units (GPUs), field-programmable gate arrays (FP-GAs), application-specific integrated circuits (ASICs), and/ or coarse-grained reconfigurable architectures (CGRAs). Deep learning processors 1078 can be hosted by a deep learning cloud platform such as Google Cloud Platform™, Xilinx™, and Cirrascale™. Examples of deep learning processors 1078 include Google's Tensor Processing Unit (TPU)™, rackmount solutions like GX4 Rackmount Series™, GX36 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1022 used in the storage subsystem 1010 can include a number of memories including a main random-access memory (RAM) 1032 for storage of instructions and data during program execution and a read-only memory (ROM) 1036 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1000 depicted in FIG. 10 is intended only as a specific example for purposes of illustrating the preferred implementations of the present invention. Many other configurations of computer system 1000 are possible having more or less components than the computer system depicted in FIG. 10.

We describe various implementations of authentication systems and methods. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, a method of authenticating a device with a provider without sending a password to or from the device, the method comprising: software on the device to intercept a DNS IP request corresponding to the server, respond to the DNS IP request with an IP corresponding to a proxy, and the proxy to receive a communication from the device to the server, to send a challenge to a TPM of the device, to confirm a response to the challenge, and to authenticate the device with the server based on a successful confirmation of the challenge.

In one implementation, a method of registering a first device provisioned with a private public key pair without sending a password to or from the first device includes a user's unenrolled first device to generate the private and public key pair, and to create and display a graphic code encoding the public key; and an enrolled administrator's second device to capture the graphic code generated by the first device, to sign the public key of the first device and create a chain of trust object using a private key of the second device, and to transmit the signed chain of trust object to a registration server to register the public key of the first device.

In one implementation, a method of authenticating a client device with a provider without sending a password to or from the device, the method includes receiving an authentication request from the client device; sending a challenge to a hardware-based security module of the client device based on the authentication request; receiving a response to the challenge; identifying the provider corresponding to the authentication request; and authenticating the client device with the provider based on the authentication request and the response to the challenge.

In one implementation, proxying communications between the client device and the provider.

In one implementation, proxying communications between the client device and the provider comprises, receiving a DNS request from the client device corresponding to the provider.

In one implementation, proxying communications between the client device and the provider comprises responding to the DNS request with an authenticating server address.

In one implementation, the hardware-based security module comprises a trusted platform module.

In one implementation, sending the challenge to the hardware-based security module comprises sending an asymmetric cryptographic challenge generated using a public key.

In one implementation, the authentication request comprises data derived from a user biometric marker.

In one implementation, authenticating the client device with the provider repeats periodically.

In one implementation, authenticating the client device with the provider comprises receiving a short-term credential.

In one implementation, a method of authenticating a client device includes: sending a second challenge to the client device; receiving a second response to the second challenge; and wherein authenticating the client device with the provider is based on the second response.

In one implementation, the second challenge comprises a proximity challenge that the client device is proximate a second client device.

In one implementation, the second challenge comprises a biometric challenge.

In one implementation, a non-transitory computer readable storage medium impressed with computer program instructions, the instructions, when executed on a processor, implement a method of authenticating a client device including: receiving an authentication request from the client device; sending a challenge to a hardware-based security module of the client device based on the authentication request; receiving a response to the challenge; identifying a provider corresponding to the authentication request; and authenticating the client device with the provider based on the authentication request and the response.

In one implementation, the challenge to the hardware-based security module comprises a private key possession challenge.

In one implementation, receiving an authentication request from the client device is received from routing trigger software on the client device.

In one implementation, sending the challenge to a hardware-based security module of the client device repeats periodically at a frequency determined by a risk assessment module.

In one implementation, a method further including: sending a second challenge to the client device; receiving a second response to the second challenge; and wherein authenticating the client device with the provider is based on the second response.

In one implementation, a system including one or more processors is coupled to memory, the memory loaded with computer instructions, the instructions, when executed on the processors, implement a method of authenticating a client device, the method including: receiving an authentication request from the client device; sending a private key possession challenge to a trusted platform module of the client device based on the authentication request; receiving a response to the challenge; identifying a provider corresponding to the authentication request; and authenticating the client device with the provider based on the authentication request and the response.

In one implementation, a method includes, sending a biometric challenge to the client device; receiving a second response to the biometric challenge; and wherein authenticating the client device with the provider is based on the second response.

Although the present invention has been described with reference to preferred embodiments, workers skilled in the art will recognize that changes may be made in form and detail without departing from the spirit and scope of the invention.

The invention claimed is:

1. A computer-implemented method of authenticating a client device with a provider without sending a password to or from the client device, the computer-implemented method comprising:

receiving an authentication request from the client device;

sending a challenge to a platform configuration register (PCR) bank from a plurality of PCR banks of a trusted platform module of the client device based on the authentication request, a first PCR bank from the plurality of PCR banks being associated with a Rivest-Shamir-Adleman (RSA) challenge from a plurality of challenges, and a second PCR bank from the plurality of PCR banks being associated with an elliptic-curve cryptography (ECC) challenge from the plurality of challenges;

receiving a response to the challenge;

identifying the provider corresponding to the authentication request; and authenticating the client device with the provider based on the authentication request and the response to the challenge.

2. The computer-implemented method of claim 1, further comprising proxying communications between the client device and the provider.

3. The computer-implemented method of claim 2, wherein proxying communications between the client device and the provider comprises, receiving a domain name server (DNS) request from the client device corresponding to the provider.

4. The computer-implemented method of claim 3, wherein proxying communications between the client device and the provider comprises responding to the DNS request with an authenticating server address.

5. The computer-implemented method of claim 1, wherein;

the challenge includes the elliptic-curve cryptography (ECC) challenge; and the PCR bank is the first PCR bank.

6. The computer-implemented method of claim 1, wherein sending the challenge to the PCR bank of the trusted platform module comprises sending, to the second PCR bank, an asymmetric cryptographic challenge generated using a public key.

7. The computer-implemented method of claim 1, wherein the authentication request comprises data derived from a user biometric marker.

8. The computer-implemented method of claim 1, wherein authenticating the client device with the provider repeats periodically.

9. The computer-implemented method of claim 8, wherein sending the challenge to the platform configuration register (PCR) bank of the trusted platform module of the client device repeats periodically.

10. The computer-implemented method of claim 1, wherein authenticating the client device with the provider comprises receiving a short-term credential.

11. The computer-implemented method of claim 1, wherein the challenge is a first challenge from the plurality of challenges, the computer-implemented method further comprising:

sending a second challenge from the plurality of challenges to the client device; and receiving a response to the second challenge, wherein authenticating the client device with the provider is based on the response to the second challenge.

12. The computer-implemented method of claim 11, wherein the second challenge comprises a proximity challenge that the client device is proximate a second client device.

13. The computer-implemented method of claim 11, wherein the second challenge comprises a biometric challenge.

14. A non-transitory computer readable storage medium storing computer program instructions, the computer program instructions, when executed on a processor, implement a method of authenticating a client device including:

receiving an authentication request from the client device;

sending a challenge to a platform configuration register (PCR) bank from a plurality of PCR banks of a trusted platform module of the client device based on the authentication request, a first PCR bank from the plurality of PCR banks being associated with a Rivest-Shamir-Adleman (RSA) challenge from a plurality of challenges, and a second PCR bank from the plurality of PCR banks being associated with an elliptic-curve cryptography (ECC) challenge from the plurality of challenges;

receiving a response to the challenge;

identifying a provider corresponding to the authentication request; and authenticating the client device with the provider based on the authentication request and the response.

15. The non-transitory computer readable storage medium of claim 14, wherein the sending the challenge to the PCR bank of the trusted platform module comprises sending a private key possession challenge to the second PCR bank.

16. The non-transitory computer readable storage medium of claim 14, wherein receiving the authentication request from the client device includes receiving the authentication request from routing trigger software on the client device.

17. The non-transitory computer readable storage medium of claim 14, wherein sending the challenge to the PCR bank of the trusted platform module of the client device repeats periodically at a frequency determined by a risk assessment module.

18. The non-transitory computer readable storage medium of claim 14, wherein the challenge is a first challenge from the plurality of challenges, the method further comprising:

sending a second challenge from the plurality of challenges to the client device; and receiving a response to the second challenge, wherein authenticating the client device with the provider is based on the response to the second challenge.

* * * * *